United States Patent [19]

Demmer et al.

[11] Patent Number: 4,578,438
[45] Date of Patent: Mar. 25, 1986

[54] PREPARATION OF RESINOUS PRODUCTS

[75] Inventors: Christopher G. Demmer; Roderick D. Hathaway, both of Cambridge, England

[73] Assignee: Ciba-Geigy Corporation, Ardsley, N.Y.

[21] Appl. No.: 710,641

[22] Filed: Mar. 11, 1985

[51] Int. Cl.[4] ...................... C08L 63/10; C08G 59/14; C08G 59/16; C08G 59/18

[52] U.S. Cl. ................................... 525/481; 524/595; 524/596; 525/488; 525/489; 525/504; 525/510; 525/513; 525/514; 525/523; 525/533; 528/107; 528/109; 528/158

[58] Field of Search .................. 528/158, 107, 109; 525/504, 523, 533, 510, 513, 514, 481, 488, 489; 524/595, 596

[56] References Cited

U.S. PATENT DOCUMENTS

| | | | |
|---|---|---|---|
| 4,308,185 | 12/1981 | Evans et al. | 525/523 X |
| 4,362,853 | 12/1982 | Demmer | 525/533 |
| 4,396,732 | 8/1983 | Sekmakas et al. | 524/596 |
| 4,410,675 | 10/1983 | Demmer | 525/533 |
| 4,500,691 | 2/1985 | Stockinger et al. | 525/504 |
| 4,514,547 | 4/1985 | Noordam | 525/523 X |

FOREIGN PATENT DOCUMENTS 98623 1/1984 European Pat. Off. .
2118936 11/1983 United Kingdom .

*Primary Examiner*—Howard E. Schain
*Attorney, Agent, or Firm*—Luther A. R. Hall

[57] ABSTRACT

Water-dilutable resinous products are obtained by reacting (A) a resin having at least one phenolic hydroxyl group and a free position ortho and/or para to a phenolic hydroxyl group, and containing a residue formed by polymerization of a vinyl monomer in the resin or in a precursor thereof, (B) an aldehyde, and (C) sulphurous acid or an organic acid containing a primary or secondary amino group or a mercaptan group and a carboxylic, sulphonic or phosphonic acid group, or a water-soluble salt thereof.

Aqueous compositions containing the resinous products and, if required, and aminoplast, a phenoplast or a blocked polyisocyanate, usually together with a minor amount of an organic solvent, are useful in the formation of surface coatings.

20 Claims, No Drawings

PREPARATION OF RESINOUS PRODUCTS

This invention relates to the preparation of new water-dilutable, including water-soluble and water-dispersible, resinous products, to aqueous compositions containing them, and to surfaces coated with such compositions.

To obtain a corrosion-resistant coating for metal containers it is conventional to coat the metal surface with a crosslinkable resin formulation dissolved in an organic solvent and then to heat the coating to evaporate the solvent and to crosslink the resin. Crosslinking the coating converts it into a tough, adherent, flexible, and protective film. During heating, the solvent is usually evaporated into the atmosphere. Since organic solvents are relatively expensive, inflammable, and usually environmentally objectionable, there exists a need for coatings which may be applied using minimal proportions of such solvents, particularly useful being coating compositions which contain a high proportion of water.

In U.S. Pat. No. 4,362,853 there are described resinous salts prepared from a phenol-terminated resin by a Mannich reaction with an aminoacid and an aldehyde, with partial or complete neutralisation of the carboxylic acid group or groups introduced by the aminoacid.

West German Offenlegungsschrift No. 3 247 281 describes resinous salts prepared from a phenol-terminated resin, either by thioalkylation with a mercaptocarboxylic acid and an aldehyde followed by at least partial neutralisation of the carboxylic acid group(s) introduced by the mercaptocarboxylic acid, or by sulphoalkylation with sulphurous acid (or a water-soluble salt thereof) and an aldehyde followed, if necessary, by at least partial neutralisation of the sulphonic acid group(s) introduced by sulphurous acid or its salt.

Further resinous salts are described in British Patent Specification No. 2 118 936 A. These salts are prepared from a phenol-terminated resin by a Mannich reaction with an aldehyde and an aminophosphonic acid or an aminosulphonic acid followed by partial or complete neutralisation of the acid group(s) introduced by this reaction.

Each of the abovementioned patent specifications discloses the use of the resinous salts, either alone or together with an aminoplast, a phenoplast or a blocked polyisocyanate, in aqueous surface coating compositions.

In U.S. Pat. No. 4,308,185 there is described a process in which an epoxide resin is reacted with an addition polymerisable monomer to form a graft polymer. For the production of a water-dispersible product, a carboxyl-functional monomer is used; to restrict reaction of the epoxide groups of the resin with the carboxyl groups of the monomer, the resin is reacted with a terminating agent, which may be bisphenol A, to remove some or all of the epoxide groups.

It has now been found that the properties of resinous reaction products of a phenol-terminated resin, an aldehyde and an acid (or salt), such as those described above, can be improved by a modification which comprises polymerising a vinyl monomer in the phenol-terminated resin, or a precursor thereof, prior to reaction with the aldehyde and acid (or salt). In particular, aqueous coating compositions having a higher viscosity for a given solids content can be obtained by the inclusion of the modified products, and coatings having improved resistance to acids can be obtained. There is nothing in any of the abovementioned patent specifications to suggest that such a modification would have an advantageous result.

Accordingly, this invention provides a process for the preparation of water-dilutable resinous products which comprises reacting together (A) a resin having at least one phenolic hydroxyl group and a free position ortho and/or para to a phenolic hydroxyl group, and containing a residue formed by polymerisation of a vinyl monomer in the resin or in a precursor thereof, (B) an aldehyde, and (C) sulphurous acid or an organic acid containing a primary or secondary amino group or a mercaptan group and a carboxylic, sulphonic or phosphonic acid group, or a water-soluble salt thereof.

The invention also provides novel water-dilutable resinous products prepared by the process of the invention.

The resin (A) generally has from 1 to 4 phenolic hydroxyl groups, resins having, on average, between 1 and 2 phenolic hydroxyl groups per molecule being preferred. Preferably, the resin has a backbone derived from an epoxide resin or phenoxy resin. The molecular weight of the resin is usually from 1000 to 10,000, preferably from 2000 to 4000.

Suitable resins (A) are those obtained by reacting an epoxide resin with a polyhydric phenol having a free position ortho and/or para to a phenolic hydroxyl group to produce a phenol-terminated resin and polymerising a vinyl monomer in the latter. Known methods can be used to react the epoxide resin with the polyhydric phenol. Preferably the epoxide resin is a diepoxide and the polyhydric phenol is a dihydric phenol; there must be at least as much dihydric phenol present as there is diepoxide, on a molar basis, in order to give a product having at least one terminal phenolic hydroxy group. The molar ratio of diepoxide to dihydric phenol is usually within the range 1:1.02 to 1:1.6, especially 1:1.1 to 1:1.5. The preferred method of carrying out the reaction is by heating the reactants at 100°–200° C. in the presence of a base, which may be a tertiary amine but is preferably an alkali metal hydroxide. Reaction may be effected in an inert solvent.

The dihydric phenol used for reaction with the epoxide resin may be a mononuclear phenol such as hydroquinone or resorcinol, but is preferably a bisphenol, which may be substituted, especially one of formula

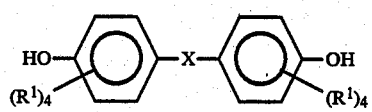

I where each $R^1$, which may be the same or different, represents a hydrogen atom, a halogen atom, an alkyl group of 1 to 4 carbon atoms, or an alkenyl group of 2 to 4 carbon atoms, with the proviso that at least one of the groups $R^1$ ortho to a phenolic hydroxyl group is a hydrogen atom, and X represents an alkylene or alkylidene group of 1 to 3 carbon atoms, a carbonyl or sulphonyl group, an oxygen or sulphur atom, or a valency bond.

Examples of especially preferred bisphenols are bis(4-hydroxyphenyl)methane and 2,2-bis(4-hydroxyphenyl)propane.

Epoxide resins (polyepoxides) preferred for reaction with the dihydric phenol are those containing two terminal glycidyl groups directly attached to an atom or atoms of oxygen, nitrogen, or sulphur.

As examples of such resins may be mentioned polyglycidyl esters obtainable by reaction of a compound containing two carboxylic acid groups per molecule with epichlorohydrin or glycerol dichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, and dimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids, such as phthalic acid, isophthalic acid, and terephthalic acid.

Further examples are polyglycidyl ethers obtainable by reaction of a compound containing at least two free alcoholic hydroxyl or phenolic hydroxyl groups per molecule with epichlorohydrin or glycerol dichlorohydrin under alkaline conditions or, alternatively, in the presence of an acid catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 2,2-bis(4-hydroxyphenyl)propane, 2,2-bis(3,5-dibromo-4-hydroxyphenyl)propane and 2,2-bis(2-allyl-4-hydroxyphenyl)propane.

Poly(N-glycidyl) compounds include, for example, those obtained by dehydrochlorination of the reaction products of epichlorohydrin with amines containing two amino-hydrogen atoms such as aniline, n-butylamine, and bis(4-methylaminophenyl)methane; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Polyepoxides having the 1,2-epoxide groups attached to different kinds of hetero atoms may be employed, e.g., the glycidyl ether-glycidyl ester of salicyclic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Polyepoxides containing non-terminal epoxide groups may also be employed, such as vinylcyclohexene dioxide, limonene dioxide, dicyclopentadiene oxide, 4-oxatetracyclo[6,2,1,0$^{2,7}$,0$^{3,5}$]undec-9-yl glycidyl ether, the bis(4-oxatetracyclo[6,2,1,0$^{2,7}$,0$^{3,5}$]undec-9-yl)ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, and 3-(3,4-epoxycyclohexyl)-8,9-epoxy-2,4-dioxaspiro[5,5]undecane.

Also, if desired, a mixture of diepoxides may be used. Polyepoxides containing more than two epoxide groups may be used but, as those skilled in the art of epoxide resins are aware, reaction of such polyepoxides with polyfunctional reactants is more difficult, there being a risk of gelation.

Preferred diepoxides are diglycidyl ethers and diglycidyl esters. Specific preferred diepoxides are diglycidyl ethers of 2,2-bis(4-hydroxyphenyl)propane or bis(4-hydroxyphenyl)methane, having a 1,2-epoxide content of more than 1.0 equivalent per kilogram.

The dihydric phenol may be used alone or, if desired, in the presence of a compound which reacts with an epoxide group of the polyepoxide but will not react further, so preventing further chain-lengthening reaction. Suitable such 'chain-terminators' are secondary monoamines, monocarboxylic acids and, more especially, monohydric phenols, p-tert.butylphenol being particularly preferred. If a chain terminator is added it must be in such a quantity that at least one epoxide group per average molecule of the polyepoxide is left free to react with the dihydric phenol.

Other suitable resins (A) are those obtained by polymerising a vinyl monomer in an epoxide resin having a secondary alcoholic hydroxyl group, and reacting the resulting product with a polyhydric phenol having a free position ortho and/or para to a phenolic hydroxyl group to give a phenol-terminated resin. Reaction of the epoxide resin (containing in situ polymerised vinyl monomer) with the polyhydric phenol, which is preferably a dihydric phenol, may be carried out under similar conditions to the epoxide resin-polyhydric phenol reaction described above, using the same dihydric phenols and, where desired, chain-terminators.

The epoxide resin having a secondary alcoholic hydroxyl group may be a polyglycidyl ester, polyglycidyl ether, or poly(N-glycidyl) compound as described above derived from epichlorohydrin and an excess of the polycarboxylic acid, polyhydric alcohol or phenol, or nitrogen compound respectively. It may alternatively be a resin obtained by advancement of any of the epoxide resins described above, preferably a resin having two terminal glycidyl groups as described above, with an advancing reactant having at least two groups reactive with epoxide groups in relative amounts such as to give an epoxide-terminated product. Suitable advancing reactants include polyfunctional, preferably difunctional, alcohols, carboxylic acids, amines, mercaptans and, especially, phenols. Preferred dihydric phenols are those of Formula I described above. The conditions for the advancement reaction are similar to those described above for the preparation of a phenol-terminated reaction product of an epoxide resin and a dihydric phenol, with the exception that the ratio of chemical equivalents of advancing reactant to epoxide resin is usually within the range 1:1.02 to 1:1.6, especially 1:1.1 to 1:1.5.

Further suitable resins (A) are those obtained by polymerising a vinyl monomer in a phenoxy resin, that is a phenol-terminated resin analogous to a resin prepared by reacting a bisphenol diglycidyl ether with a bisphenol, but obtained directly by reaction of a bisphenol with epichlorohydrin. The phenoxy resin-forming reaction is usually carried out in an alkaline medium using substantially equimolar amounts of bisphenol and epichlorohydrin, a chain terminator such as a monohydric phenol being added when the desired molecular weight level is reached.

As indicated above, the vinyl monomer may be polymerised in the phenol-terminated resin or in an epoxide resin precursor thereof. The monomer, together with a free radical polymerisation initiator, may be mixed with the resin or with a solution of the resin in an organic solvent such as n-butanol, 2-ethoxyethanol, 2-butoxyethanol, ethyl acetate, toluene, xylene or tetrahydrofuran. In situ polymerisation may be effected by heating the mixture at a temperature of 60° to 200° C., preferably 100° to 150° C., usually for a period of from 1 to 10 hours. The monomer may be used in an amount to provide up to 50% by weight of the resin (A), i.e. the combined weight of the phenol-terminated resin and the polymerised vinyl monomer. Amounts to provide up to 40%, especially 10 to 30%, by weight of resin (A) are preferred. Thus, where the monomer is polymerised in the phenol-terminated resin, it may be used in amounts up to 100% by weight of that resin, amounts up to 67%, especially 11 to 43%, by weight being preferred. The free radical initiator is usually present in an amount of 1 to 20%, typically 2 to 10%, by weight of the monomer. The monomer and/or initiator can conveniently be added to the resin in two or more stages, the mixture being heated for 1 to 3 hours after each addition.

Suitable vinyl monomers include styrenes, for example styrene itself, ring-substituted styrenes such as 4-methylstyrene and 4-bromostyrene, and α- and β-substituted styrenes such as α-methylstyrene and β-methylstyrene; acrylic acid, methacrylic acid and esters thereof, for example alkyl esters, particularly those in which the alkyl group has from 1 to 6 carbon atoms such as ethyl acrylate and methyl methacrylate, and hydroxyalkyl esters, particularly hydroxyethyl and hydroxypropyl esters; acrylamide, methacrylamide and hydroxyalkyl derivatives thereof such as N-methylolacrylamide; and vinyl esters of carboxylic acids such as vinyl acetate and vinyl propionate. Mixtures of two or more vinyl monomers can be used. Particularly preferred monomers are styrene, methyl methacrylate and mixtures of these two compounds.

The free radical polymerisation initiator is suitably a peroxide, which may be inorganic or organic. Examples of inorganic peroxides are hydrogen peroxide and persulphates such as potassium and sodium persulphates. Examples of organic peroxides are acyl peroxides such as benzoyl peroxide, p-chlorobenzoyl peroxide and t-butyl perbenzoate, ketone peroxides such as methyl ethyl ketone peroxide and cylohexanone peroxide, and hydroperoxides such as cumene hydroperoxide and t-butyl hydroperoxide. Other suitable initiators include azo compounds such as azobis(isobutyronitrile) and azobis(α-methylbutyronitrile). Preferred initiators are benzoyl peroxide, cumene hydroperoxide and azobis(isobutyronitrile).

The aldehyde (B) which is reacted with the resin (A) and the acid (or salt) (C) to form a water-dilutable product is preferably an aliphatic aldehyde, particularly an aldehyde having 1 to 6 carbon atoms, although aromatic aldehydes can also be used, in particular those having 7 to 12 carbon atoms. Formaldehyde, which may conveniently be formed in situ from paraformaldehyde, is an especially preferred aldehyde.

Among useful acids (C) are aminosulphonic and aminophosphonic acids. The amino group and sulphonic or phosphonic acid group may be attached to aliphatic, aromatic, or araliphatic residues. Suitable such acids include those of formula

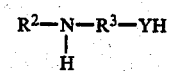     II where

R$^2$ denotes a hydrogen atom or an alkyl group of 1 to 6 carbon atoms,

R$^3$ denotes an aliphatic, aromatic or araliphatic di- or trivalent hydrocarbon group of 1 to 10 carbon atoms which may contain a free sulphonic or phosphonic acid group, and Y denotes the residue of a sulphonic or phosphonic acid group after removal of one hydrogen atom (i.e., —SO$_3$— or —PO$_2$H—).

Aminosulphonic acids of formula II include sulphanilic acid, taurine, orthanilic acid, and 2-aminobenzene-1,4-disulphonic acid.

Aminophosphonic acids of formula II include those which are further of formula

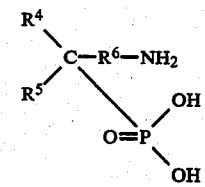     III where either

R$^4$ denotes an alkyl group of 1 to 4 carbon atoms, an aryl group of 6 to 10 carbon atoms or a free phosphonic acid group of formula —P(:O)(OH)$_2$, R$^5$ denotes a hydrogen atom, an alkyl group of 1 to 4 carbon atoms, or an aryl group of 6 to 10 carbon atoms, and R$^6$ denotes a covalent bond or an alkylene group of 1 to 4 carbon atoms, or R$^4$ and R$^6$, together with the carbon atom to which they are attached, form an aromatic ring and R$^5$ is absent.

Specific aminophosphonic acids of formula III include 2-amino-1-phenylethyl phosphonic acid, 1-aminoethylidenebis(phosphonic acid) and aminophenylmethylenebis(phosphonic acid).

Other useful acids (C) are mercaptocarboxylic acids. In these acids, the mercaptan and carboxylic acid groups may be attached to aliphatic, aromatic or araliphatic residues. Suitable mercaptocarboxylic acids include those of formula

HS—R$^7$—COOH     IV where R$^7$ denotes an aliphatic, aromatic or araliphatic divalent group of 1 to 10 carbon atoms which may contain a further carboxylic acid group.

Specific acids of formula IV are thioglycolic acid, 2-mercaptopropionic acid, 3-mercaptopropionic acid and thiomalic acid.

Further useful acids (C) are aminocarboxylic acids. The amino and carboxylic acid groups may be attached to aliphatic, aromatic or araliphatic residues. Suitable aminocarboxylic acids include those of formula

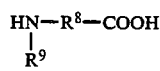

where

R[8] denotes an aliphatic, aromatic or araliphatic divalent group of 1 to 10 carbon atoms which may contain a further carboxylic acid group and is preferably an alkylene group of 1 to 4 carbon atoms or a phenylene group, and R[9] denotes a hydrogen atom, a group of formula

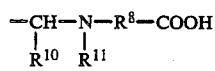

or an alkyl group of 1 to 6 carbon atoms which may be substituted by a further carboxylic group or by a group of formula $-CH(R^{10})OH$ or $-CH(R^{10})OR^{12}$, with the proviso that R[8] and R[9] together contain not more than one carboxylic acid group, R[10] denotes a hydrogen atom, an alkyl group of 1 to 4 carbon atoms, or an aryl group of 6 to 10 carbon atoms, R[11] denotes a hydrogen atom, a carboxylic acid group, or an alkyl group of 1 to 6 carbon atoms which may be substituted by a carboxylic acid group or by a group of formula $-CH(R^{10})OH$ or $CH(R^{10})OR^{12}$, and R[12] denotes an alkyl group of 1 to 6 carbon atoms or an alkoxyalkyl group in which the alkoxy group and alkyl group each have from 1 to 6 carbon atoms.

Specific acids of formula V which may be used include sarcosine, iminodiacetic acid, anthranilic acid, glycine, glutamic acid, aspartic acid and p-aminobenzoic acid.

Salts which may be used as component (C) in the process of the invention include the potassium and sodium salts of the acids described above and of sulphurous acid.

Preferably, component (C) is an aminocarboxylic acid or a mercaptocarboxylic acid, specific especially preferred acids being glycine, glutamic acid, aspartic acid, p-aminobenzoic acid, sarcosine and thioglycolic acid.

The reaction between the resin (A), the aldehyde (B) and the acid or salt (C) may be effected by heating the reactants, usually in an inert solvent, preferably in the presence of sufficient base at least partially to neutralise any free acid. The reaction temperature is usually within the range 60° to 180° C., especially 75° to 140° C., and the reaction is usually complete within a period of 15 minutes to 8 hours.

If necessary, a base, or further base, may be added to the reaction product to improve its water-dilutability. Generally at least 25% of acid groups present in the reaction product are neutralised to give a fully water-dilutable product, although the extent of neutralisation may vary with the nature of the reactant (C).

Suitable inert solvents include hydrocarbons, ethers, alcohols, and esters; amongst these, toluene, xylene, tetrahydrofuran, ethyl acetate, and especially 2-butoxyethanol and n-butanol, are preferred. Suitable bases for the at least partial neutralisation include sodium hydroxide, sodium carbonate, potassium hydroxide, potassium carbonate, ammonia, triethylamine, and triethanolamine; 2-(dimethylamino)-2-methylpropan-1-ol and 2-(dimethylamino)ethanol are particularly preferred.

Usually 0.3 to 2.0 moles of the acid or salt (C) are used per mole of phenolic hydroxyl groups in the resin (A). An excess of the aldehyde (B) is usually employed, especially 1.1 to 4.0 moles of the aldehyde per mole of (C), since the products then exhibit greater stability to storage at room temperature. If the resin (A) has more than one free position ortho or para to a phenolic hydroxyl group, the use of an excess of an aliphatic aldehyde usually results in a product having a hydroxyalkyl group attached to the phenolic ring, as a consequence of a reaction between the phenol-terminated resin and the excess aldehyde such as occurs in the formation of phenol-aldehyde resols under basic conditions; where the aldehyde is formaldehyde, the hydroxyalkyl group is, of course, a methylol group.

The resinous products of the invention, that is, the reaction products of (A), (B) and (C), may be used, in the form of heat-curable compositions, to form surface coatings.

This invention accordingly further provides heat-curable compositions comprising 100 parts by weight of a reaction product of (A), (B) and (C), calculated on its solids content (as hereinafter defined) and 2 to 200 parts, preferably 25 to 150 parts, by weight, calculated on its solids content, of an aminoplast, a phenol-formaldehyde resin, or a blocked polyisocyanate, the aminoplast or phenol-formaldehyde resin having at least 2 groups of formula $$-CH_2OR^{13} \qquad \text{VII}$$

attached directly to an amidic nitrogen atom or atoms or directly attached to carbon atoms of a phenolic ring, where R[13] represents a hydrogen atom or an alkyl group of from 1 to 6 carbon atoms.

For use in such heat-curable compositions, it is preferred that the reaction product of (A), (B) and (C) has alcoholic hydroxyl groups, such as secondary alcoholic hydroxyl groups in residues of formula $-CH_2-CH(OH)-CH_2-$ in the backbone of a product derived from an epoxide resin or phenoxy resin, or hydroxyalkyl groups attached to the phenolic rings as described above.

Such compositions in a form suitable for application will usually also contain water and a minor proportion, compared with the volume of water, of an organic solvent, such as an ether, alcohol, ketone, or ester, especially 2-butoxyethanol or n-butanol. Methylolated compounds which may be used to form the compositions include urea-formaldehyde condensates, aminotriazine-formaldehyde condensates, especially melamine-formaldehyde and benzoguanamine-formaldehyde condensates, and phenol-formaldehyde condensates. These may be etherified if desired, e.g., the n-butyl ethers may be used, In many cases the methylolated compounds and their ethers are not themselves water-soluble or water-dispersible. Incorporation of a product of the invention aids the dispersion or solution of such materials in water, giving stable solutions or dispersions of the mixtures.

Examples of suitable blocked polyisocyanates (i.e., those which are stable in the aqueous dispersion at room temperature but which become reactive on heating) include di- and polyisocyanates blocked with caprolactam, an oxime (e.g., cyclohexanone oxime), a monohydric phenol (e.g., phenol itself, p-cresol, and p-tert-.butylphenol), or a monohydric aliphatic, cycloaliphatic, or araliphatic alcohol (e.g., methanol, n-butanol, decanol, 1-phenylethanol, 2-ethoxyethanol, and 2-n-butoxyethanol). Suitable isocyanates include aromatic di-isocyanates such as m-phenylene, 1,4-naphthylene, 2,4- and 2,6-tolylene, and 4,4'-methylenebis(phenylene)-di-isocyanates, and also their prepolymers with glycols (e.g., ethylene and propylene glycol), glycerol, trimethylolpropane, pentaerythritol, diethylene glycol, and adducts of alkylene oxides with these aliphatic di- and polyhydric alcohols.

The compositions may be cured by heating at 100° C. to 275° C., preferably 150° C. to 225° C., for from 30 seconds to 1 hour, preferably from 2 to 30 minutes.

Other water-soluble or water-dispersible film-forming substances may also be included, such as alkyd resins and acrylic resins. The amount of such materials may vary between wide limits, but should not be so great as to mask the advantageous properties of the compositions of this invention. Typically, additions of up to 50%, and preferably not more than 30% may be used, these percentages being based on the solids content of the materials.

By the term "solids content", as used throughout the present specification and the claims thereto, is meant the percentage residue left after a 1 g sample of the material has been heated in a 5 cm diameter open dish in an oven at 120° C. for 3 hours at atmospheric pressure.

When the reaction product of (A), (B) and (C) contains a hydroxyalkyl group having 1 to 4 carbon atoms, such as a methylol group, it may be heat-cured without including an aminoplast, a phenol-formaldehyde resin, or a blocked polyisocyanate.

A further aspect of this invention accordingly provides a method of coating a surface which comprises applying thereto a reaction produce of (A), (B) and (C) substituted by a hydroxyalkyl group of 1 to 4 carbon atoms and heating the coated surface to a temperature within the range 100° to 275° C., preferably 150° C. to 225° C., for from 30 seconds to 1 hour and preferably for from 2 to 30 minutes, to cure the product.

Surfaces to be coated with a composition of this invention are preferably of primed or unprimed metal, especially a ferrous metal, but may be, e.g., of wood or a heat-resistant synthetic material.

The compositions may be applied by immersion, brushing, rollering, spraying (including electrostatic spraying), by electrodeposition, or by any other conventional means. They may, if desired, include pigments and dyes. Other materials which may be incorporated include extenders such as calcium carbonate, calcium sulphate, barium sulphate, and magnesium silicate, surface-active agents, flow additives, and plasticisers. They may also contain a strong acid, e.g., an aromatic sulphonic acid or its salt with an amine or ammonia, as catalyst.

This invention is illustrated by the following Examples in which all percentages are by weight.

Starting materials used in the Examples are prepared as follows:

PHENOL I

Epoxide resin I, a liquid diglycidyl polyether of 2,2-bis(4-hydroxyphenyl)propane (359 g; epoxide content 5.35 equiv./kg), 2,2-bis(4-hydroxyphenyl)propane (246 g), p-tert.butylphenol (20 g), and 10% aqueous sodium hydroxide solution (0.39 g) are stirred and heated under nitrogen to 180° C. The molar ratio of epoxide resin to bisphenol to monohydric phenol is 1:1.14:0.14. An exothermic reaction commences and the temperature of the mixture rises spontaneously to 207° C. The mixture is cooled to 180° C. and stirred at this temperature for 3½ hours to give Phenol I, a phenolic hydroxyl group-terminated resin having a negligible epoxide group content and an average molecular weight of 1880.

PHENOL II

Epoxide resin I (2500 g) is stirred and heated under nitrogen to 120° C. p-Tert.butylphenol (75 g) and 2,2-bis(4-hydroxyphenyl)propane (897 g) are added followed by a solution comprising sodium hydroxide (0.25 g), water (10.70 g) and methanol (3.50 g) and the temperature is raised to 160° C. The molar ratio of epoxide resin to bisphenol to monohydric phenol is 1:0.57:0.07. An exothermic reaction commences and the temperature of the mixture rises spontaneously to 210° C. The mixture is cooled to 190° C. and stirred at this temperature for a further two hours, after which it has an epoxide content of 1.41 equiv./kg. 2,2-Bis(4-hydroxyphenyl)propane (865 g) is added and the mixture is stirred for a further two hours at 190° C., to give Phenol II, a phenolic hydroxyl group-terminated resin having a negligible epoxide group content (not more than 0.045 equiv./kg) and an average molecular weight of 1945.

PHENOL III

This is prepared in a similar manner to Phenol II, except that the molar ratio of epoxide resin to the first bisphenol addition to monohydric phenol to second bisphenol addition is 1:0.58:0.04:0.55. The epoxide content following the first bisphenol addition is 1.41 equiv./kg. Following the second bisphenol addition the mixture is stirred and heated at 195° C. for 5 hours to give Phenol III, a phenolic hydroxyl group-terminated resin having a negligible epoxide content (not more than 0.05 equiv./kg) and an average molecular weight of 2035.

PHENOL IV

Epoxide resin I (338 g), 2,2-bis(4-hydroxyphenyl)propane (225 g) and 5% aqueous sodium hydroxide solution (0.5 g) are stirred and heated under nitrogen to 160° C. The molar ratio of epoxide resin to bisphenol is 1:1.2. An exothermic reaction commences and the temperature rises to 202° C. The mixture is cooled to 180° C. and stirred at this temperature for 2 hours. 2-Butoxyethanol is added and the reaction continued at 180° C. for a further 3 hours to give Phenol IV, a phenolic hydroxyl group-terminated resin having a molecular weight of 2900 and a negligible epoxide content.

EXAMPLE 1

A solution of Phenol I (50 g; 0.027 mole) in 2-butoxyethanol (8.8 g) and n-butanol (10 g) is heated to 120° C. in a flange flask equipped with a stirrer, condenser, dropping funnel and thermometer. A monomer/initiator mixture consisting of;

| | |
|---|---|
| styrene | 6.6 g |
| methyl methacrylate | 6.3 g |
| benzoyl peroxide (70% in water) | 1.6 g |
| n-butanol | 10.0 g | is added over 2 hours via the dropping funnel to the solution of Phenol I. Reaction is continued at 120° C. for a further 2 hours, before a further charge of benzoyl peroxide (0.2 g) is added and reaction continued for another hour. A second monomer/initiator mixture consisting of:

| | |
|---|---|
| methyl methacrylate | 3.2 g |
| benzoyl peroxide (70% in water) | 0.4 g |
| n-butanol | 5.0 g | is added over 1 hour. A further charge of benzoyl peroxide (0.2 g) is added and the reaction continued at 120° C. for a further 2 hours. The reaction mixture is cooled to 100° C., followed by addition of:

| | |
|---|---|
| aspartic acid | 3.3 g |
| DMAMP-80* | 3.7 g |
| n-butanol | 11.0 g |
| 2-butoxyethanol | 9.0 g |

*80% aqueous solution of 2-(dimethylamino)-2-methylpropan-1-ol.

The reaction mixture is heated for ½ hour at 100° C., then cooled to 90° C. Paraformaldehyde (2.5 g; 91% active content, 0.076 mole) is added and the temperature maintained at 85° C. for 6 hours, by which time the measured free formaldehyde content is 0.7%. The resinous product is diluted with water to give a stable emulsion having a solids content of 25% which is fully dilutable with water.

EXAMPLE 2

A solution of Phenol IV (50 g; 0.018 mole) in 2-butoxyethanol (10 g) and n-butanol (10 g) is heated to 120° C. in a flange flask equipped with stirrer, condenser, dropping funnel and thermometer. A monomer/initiator mixture consisting of:

| | |
|---|---|
| styrene | 6.6 g |
| methyl methacrylate | 6.3 g |
| benzoyl peroxide (70% in water) | 1.6 g |
| n-butanol | 10.0 g | is added over 2 hours via the dropping funnel to the solution of Phenol IV. Reaction is continued at 120° C. for a further 2 hours before a further charge of benzoyl peroxide (0.2 g) is added and the reaction continued for another hour. A second monomer/initiator mixture consisting of:

| | |
|---|---|
| methyl methacrylate | 3.2 g |
| benzoyl peroxide (70% in water) | 0.4 g |
| n-butanol | 5.0 g | is added over 1 hour. A further charge of benzoyl peroxide (0.2 g) is added and the reaction continued at 120° C. for a further 2 hours. The reaction mixture is cooled to 100° C. and the following are added:

| | |
|---|---|
| aspartic acid | 3.3 g |
| DMAMP-80 | 3.7 g |
| n-butanol | 8.7 g |
| 2-butoxyethanol | 6.9 g |

The reaction mixture is heated for ½ hour at 100° C., then cooled to 90° C. Paraformaldehyde (2.5 g; 91% active content, 0.076 mol) is added and the temperature maintained at 85° C. for 6 hours, by which time the measured free formaldehyde content is 0.8%. No free styrene can be detected in the product by gas chromatography. After adding further DMAMP-80 (1.8 g), the reaction product is diluted with water to give a stable emulsion having a solids content of about 25% which is fully dilutable with water.

EXAMPLE 3

A solution of Phenol I (50 g: 0.027 mole) in 2-butoxyethanol (10 g) and n-butanol (10 g) is heated to 120° C. in a flange flask equipped with stirrer, condenser, dropping funnel and thermometer. A monomer/initiator mixture consisting of:

| | |
|---|---|
| styrene | 6.6 g |
| methyl methacrylate | 6.3 g |
| n-butanol | 10.0 g |
| azobis(isobutyronitrile) | 1.12 g | is added over 2 hours via the dropping funnel to the solution of Phenol I. Reaction is continued at 120° C. for a further 2 hous before a further charge of azobis-(isobutyronitrile) (0.2 g) is added and the reaction continued for another hour. A second monomer/initiator mixture consisting of

| | |
|---|---|
| methyl methacrylate | 3.2 g |
| n-butanol | 5.0 g |
| azobis(isobutyronitrile) | 0.28 g | is added over 1 hour. A further charge of azobis-(isobutyronitrile) (0.2 g) is added and the reaction continued at 120° C. for a further 2 hours. The reaction mixture is cooled to 100° C. and the following are added:

| | |
|---|---|
| aspartic acid | 3.3 g |
| DMAMP-80 | 3.7 g |
| n-butanol | 8.6 g |
| 2-butoxyethanol | 6.8 g |

The mixture is heated for ½ hour at 100° C., then cooled to 90° C., Paraformaldehyde (2.5 g; 91% active content, 0.076 mole) is added and the temperature is maintained at 85° C. for 6 hours, by which time the measured free formaldehyde content is 0.3%. The resinous product is diluted with water to give a stable emulsion having a 25% solids content which is fully dilutable with water.

EXAMPLE 4

A solution of Phenol I (50 g: 0.027 mole) in 2-butoxyethanol (10 g) and n-butanol (10 g) is heated to 120° C. in a flange flask equipped with stirrer, condenser, dropping funnel and thermometer. A monomer/initiator mixture consisting of:

| | |
|---|---|
| styrene | 6.6 g |
| methyl methacrylate | 6.3 g |
| n-butanol | 10.0 g |
| cumene hydroperoxide (80% in cumene) | 1.12 g | is added over 2 hours via the dropping funnel to the solution of Phenol I. Reaction is continued at 120° C. for a further 2 hours before a further charge of cumene hydroperoxide (0.2 g) is added and the reaction continued for another hour. A second monomer/initiator mixture consisting of:

| | |
|---|---|
| methyl methacrylate | 3.2 g |
| cumene hydroperoxide (80% in cumene) | 0.28 g |
| n-butanol | 5.0 g | is added over 1 hour. A further charge of cumene hydroperoxide (0.2 g) is added and the reaction continued at 120° C. for a further 2 hours. The reaction mixture is cooled to 100° C. and the following are added:

| | |
|---|---|
| aspartic acid | 3.3 g |
| DMAMP-80 | 3.7 g |
| n-butanol | 8.6 g |
| 2-butoxyethanol | 6.8 g |

The reaction mixture is heated for ½ hour at 100° C., then cooled to 90° C. Paraformaldehyde (2.5 g; 91% active content, 0.076 mole) is added and the temperature is maintained at 80° C. for 6 hours, by which time the measured free formaldehyde content is 0.45%. The resinous product is diluted with water to give a stable emulsion having a solids content of 25% which is fully dilutable with water.

EXAMPLE 5

A solution of Phenol III (500 g; 0.25 mole) in 2-butoxyethanol (100 g) and n-butanol (100 g) is heated to 120° C. in a flange flask equipped with stirrer, condenser, dropping funnel and thermometer. A monomer/initiator mixture consisting of

| | |
|---|---|
| styrene | 66.0 g |
| methyl methacrylate | 63.0 g |
| cumene hydroperoxide (80% in cumene) | 11.0 g |
| n-butanol | 100.0 g | is added over 2 hours via the dropping funnel to the solution of Phenol III. Reaction is continued at 120° C. for a further 2 hours before a further charge of cumene hydroperoxide (2.0 g) is added and the reaction continued for another hour. A second monomer/initiator mixture consisting of:

| | |
|---|---|
| methyl methacrylate | 32.0 g |
| cumene hydroperoxide (80% in cumene) | 2.8 g |
| n-butanol | 50.0 g | is added over 1 hour. A further charge of cumene hydroperoxide (2.0 g) is added and the reaction continued at 120° C. for a further 2 hours. The reaction mixture is cooled to 100° C. and the following are added:

| | |
|---|---|
| aspartic acid | 33 g |
| DMAMP-80 | 37 g |
| n-butanol | 86 g |
| 2-butoxyethanol | 68 g |

The reaction mixture is heated for 30 minutes at 100° C., then cooled to 90° C. Paraformaldehyde (25 g; 91% active content, 0.76 mole) is added and the temperature is maintained at 85° C. for 6 hours, by which time the measured free formaldehyde content is 0.45%. The resinous product is diluted with water to produce a stable emulsion having a solids content of 25% which is fully dilutable with water.

EXAMPLE 6

A solution of Phenol I (50 g: 0.027 mole) in 2-butoxyethanol (10 g) and n-butanol (10 g) is heated to 120° C. in a flange flask equipped with stirrer, condenser, dropping funnel and thermometer. A monomer/initiator mixture consisting of:

| | |
|---|---|
| styrene | 15.0 g |
| cumene hydroperoxide (80% in cumene) | 1.5 g |
| n-butanol | 10.0 g | is added over 2 hours via the dropping funnel to the solution of Phenol I. Reaction is continued at 120° C. for a further 2 hours before a further charge of cumene hydroperoxide (0.2 g) is added and the reaction continued for another 2 hours. A second monomer/initiator mixture consisting of

| | |
|---|---|
| methyl methacrylate | 3.0 g |
| cumene hydroperoxide (80% in cumene) | 0.3 g |
| n-butanol | 5.0 g | is added over 1 hour. A further charge of cumene hydroperoxide (0.2 g) is added and the reaction continued at 120° C. for a further 2 hours. The reaction mixture is cooled to 100° C. and the following are added:

| | |
|---|---|
| aspartic acid | 3.3 g |
| DMAMP-80 | 3.7 g |
| n-butanol | 9.8 g |
| 2-butoxyethanol | 7.4 g |

The reaction mixture is heated for ½ hour at 100° C., then cooled to 90° C. Paraformaldehyde (2.5 g; 91% active content, 0.076 mole) is added and the temperature is maintained at 85° C. for 6 hours. The resinous product is diluted with water to produce a stable emulsion having a solids content of 25% which is fully dilutable with water.

EXAMPLE 7

A solution of Phenol III (320 g; 0.13 mole) in 2-butoxyethanol (155.4 g) and n-butanol (155.4 g) is heated to 110° C. in a flanged flask equipped with stirrer, condenser, nitrogen purge, temperature recorder and peristaltic pump feed inlet. Benzoyl peroxide (70% in water, 0.55 g) is added and styrene feed started at 0.8 ml. min.$^{-1}$, 80 g of styrene being added over 90 minutes and further additions of benzoyl peroxide being made after 30 minutes (1.55 g), 60 minutes (1.55 g) and 90 minutes (3.1 g). The mixture is heated at 110° C. for a further 2 hours. Aspartic acid (21.2 g, 0.16 mole) and 2-(dimethylamino)-2-methylpropan-1-ol (80% aqueous solution, 23.6 g; 0.16 mole) are added and the mixture is stirred for 15 minutes, then cooled to 80° C. Paraformaldehyde (14.2 g; active content 91%, 0.34 mole) is added and the temperature is maintained at 80° C. for 3 hours. The resinous product solution obtained has a solids content of 56% and is fully dilutable with water.

EXAMPLE 8

Example 7 is repeated using Phenol I (320 g; 0.17 mole) instead of Phenol III. The product has a solids content of 56% and is fully dilutable with water.

EXAMPLE 9

An epoxide resin having an epoxide content of 1.52 equiv./kg (499.1 g), prepared by advancing Epoxide resin I with 2,2-bis(4-hydroxyphenyl)propane, is heated at 145° C. and a mixture of styrene (99.8 g) and cumene hydroperoxide (80% solution in cumene, 5.5 g) is added via peristaltic pump over a period of 1 hour. Reaction is continued at 145° C. for a further 2 hours. 2,2-Bis(4-hydroxyphenyl)propane (124.5 g, 0.55 mole) is added and the temperature of the reaction mixture is slowly raised to 190° C. over a period of 5 hours, by which time the epoxide content is negligible. 2-Butoxyethanol (285.2 g) and n-butanol (285.2 g) are added and the resulting solution is cooled to 110° C. Aspartic acid (36.4 g, 0.27 mole) and 2-(dimethylamino)-2-methylpropan-1-ol (80% aqueous solution, 40.6 g; 0.28 mole) are added and the reaction mixture is cooled to 80° C. Paraformaldehyde (24.3 g; 91% active content, 0.74 mole) is added and the temperature of the mixture is maintained at 80° C. for 3 hours. The resulting solution of resinous product has a solids content of 56% and is fully dilutable with water.

EXAMPLE 10

Phenol II (722 g; 0.37 mole) is dissolved in 2-butoxyethanol (350.6 g) and n-butanol (350.6 g) at 120° C. A solution comprising cumene hydroperoxide (80% solution in cumene, 7.6 g) and styrene (144.4 g) is added via a peristaltic pump over 150 minutes, and the mixture is heated at 120° C. for a further 3 hours. The solution is cooled to 110° C. and aspartic acid (47.8 g; 0.36 mole) and 2-(dimethylamino)-2-methylpropan-1-ol (80% aqueous solution, 53.2 g; 0.36 mole) are added. After cooling to 80° C., paraformaldehyde (32.0 g; 91% active content, 0.97 mole) is added and the mixture stirred at 80° C. for 3 hours. The resulting resinous product solution has a solids content of 58% and is fully dilutable with water. A mixture of the product with a commercially available butylated urea-formaldehyde resin of solids content 53%, in a solids ratio of 90:10, when diluted with water to give an emulsion having a solids content of 25% suitable for use as a coating composition, has a viscosity (Ford B4 cup) of 18 seconds.

EXAMPLE 11

A solution of Phenol I (50 g: 0.027 mole) in 2-butoxyethanol (10 g) and n-butanol (10 g) is heated to 120° C. A monomer/initiator mixture consisting of

| styrene | 10.0 g |
|---|---|
| methyl methacrylate | 2.5 g |
| cumene hydroperoxide | 1.25 g |
| (80% solution in cumene) | |
| n-butanol | 10.0 g | is added to the solution dropwise over 2 hours. Reaction is continued at 120° C. for a further hour, before further cumene hydroperoxide (0.2 g) is added and the reaction continued at 120° C. for another 2 hours. A second monomer/initiator mix consisting of

| methyl methacrylate | 3.0 g |
|---|---|
| cumene hydroperoxide | 0.3 g |
| (80% solution in cumene) | |
| n-butanol | 5.0 g | is added dropwise over 1 hour. A further charge of cumene hydroperoxide (0.2 g) is added and the reaction continued at 120° C. for a further 2 hours. The reaction mixture is cooled to 100° C. and the following are added:

| aspartic acid | 3.3 g |
|---|---|
| DMAMP-80 | 3.7 g |
| n-butanol | 8.6 g |
| 2-butoxyethanol | 6.8 g |

The mixture is maintained at 100° C. for 30 minutes, then cooled to 90° C. Paraformaldehyde (2.5 g; 91% active content, 0.076 mole) is added and the temperature maintained at 85° C. for 6 hours, by which time the measured free formaldehyde content is 0.6%. The resulting solution of resinous product is fully dilutable with water. A mixture of the product with a commercially available butylated urea-formaldehyde resin having a solids content of 53%, in a solids ratio of 90:10, when diluted with wter to given an emulsion having a solids content of 25% which is suitble for use as a coating composition, has a viscosity (Ford B4 cup) of 26 seconds.

EXAMPLE 12

A solution of Phenol I (50 g: 0.027 mole) in 2-butoxyethanol (20 g) is heated to 120° C. A monomer/initiator mixture consisting of

| styrene | 6.3 g |
|---|---|
| methyl methacrylate | 3.1 g |
| cumene hydroperoxide | 0.9 g |
| (80% solution in cumene) | |
| 2-butoxyethanol | 10.0 g | is added to the solution dropwise over 2 hours. Reaction is continued at 120° C. for a further hour, before further cumene hydroperoxide (0.2 g) is added and reaction continued at 120° C. for another 2 hours. A second monomer/initiator mix consisting of

| methyl methacrylate | 3.1 g |
|---|---|
| cumene hydroperoxide | 0.3 g |
| (80% solution in cumene) | |
| 2-butoxyethanol | 5.0 g | is added dropwise over 1 hour. A further charge of cumene hydroperoxide (0.2 g) is added and the reaction continued at 120° C. for a further 2 hours. The reaction mixture is cooled to 100° C. and the following are added:

| thioglycolic acid | 11.5 g |
|---|---|
| dimethylaminoethanol | 11.1 g |
| 2-butoxyethanol | 10.0 g |

The mixture is maintained at 100° C. for 30 minutes, then cooled to 90° C. Paraformaldehyde (5.5 g; 91% active content, 0.168 mole) is added and the temperature raised to reflux (137° C.). The mixture is maintained at reflux for 6½ hours by which time the measured free formaldehyde content is 0.35%. The resulting solution of resinous product is fully dilutable with water.

EXAMPLE 13

A coating composition is prepared by mixing the product of Example 5 with a commercially available butylated phenolformaldehyde resin, supplied as a solution (56% solids content) in n-butanol containing a small amount of toluene, in a solids ratio of 70:30. The composition is applied to a tin-coated steel plate by spin-coating, having a coating 2 to 4 μm thick. The plates are heated at 200° C. for 10 minutes to cure the coating. The cured coating shows no defects after immersion in boiling 2% acetic acid for 6 hours.

EXAMPLE 14

A coating composition is prepared by mixing the product of Example 7 with a commercially available butylated urea-formaldehyde resin, of solids content 53%, in the ratio 90:10 calculated on the solids content and diluting the mixture with water to give an emulsion having a 25% solids content. The viscosity of the emulsion is measured. The emulsion is applied to electrolytic tinplate as a film 2 to 4 μm thick and cured by heating at 215° C. for 3 minutes. The resulting coated tinplate is tested. The results of the viscosity measurements and the tests on the cured coating are shown below:

| Emulsion Viscosity (Ford B4 Cup) | Greater than 100 secs | |
|---|---|---|
| MEK rubs[1] | 22 | |
| Wedge bend[2] pass at | 82% | |
| Adhesion (cross hatch)[3] pass at | 100% | |
| Pasteurisation[4] | Adhesion | Blushing |
| in water 100° C./1 hour | 0 | 0 |
| in steam 120° C./1 hour | 0 | 0 |
| in boiling 5% citric acid/1 hour | 0 | 0 |
| in boiling 5% acetic acid/1 hour | 5 | 0 |
| in boiling 5% phosphoric acid/1 hour | 0 | 0 |

[1]The MEK rub test comprises giving the coated surface double rubs with cotton wool soaked in methyl ethyl ketone. The result is recorded as the number of such rubs required before the first sign of attack on the coating is observed.
[2]The wedge bend test comprises impact-bending the specimen over a mandrel 10 cm. long, having an outside diameter of 6 mm. at one end and tapering to a point at the other. The specimen is then examined to determine the percentage of the length of the sample from which the coating did not flake off.
[3]The cross-hatch adhesion test comprises cross-hatching the cured coating by cutting with a knife edge parallel lines 3 mm apart in one direction, then others intersecting these at 90°. A strip of adhesive tape is then firmly pressed across the cross-hatched area. The tape is pulled off with a quick continuous pull, and the area examined for removal of coating. The percentage of the area from which the coating is not removed is recorded.
[4]The pasteurisation tests comprise heating the samples in water, steam or the specified acids for the given time examining the coated surface for blushing and repeating the cross-hatch adhesion test. The adhesion and blushing characteristics are recorded on a scale of 0 to 5, 0 indicating excellent adhesion and freedom from blushing and 5 indicating poor results in these properties.

What is claimed is:

1. A water-dilutable resinous product prepared by reacting together
    (A) a resin having at least one phenolic hydroxyl group and a free position ortho and/or para to a phenolic hydroxyl group, and containing a residue formed by polymerization of a vinyl monomer in the resin or in a precursor thereof,
    (B) an aldehyde, and
    (C) sulfurous acid or an organic acid containing a primary or secondary amino group or a mercaptan group and a carboxylic, sulfonic or phosphonic acid group, or a water-soluble salt thereof.

2. A resinous product according to claim 1, in which (A) has from 1 to 4 phenolic hydroxyl groups.

3. A resinous product according to claim 1, in which (A) has a backbone derived from an epoxide resin or phenoxy resin.

4. A resinous product according to claim 1, in which (A) has a molecular weight from 1000 to 10,000.

5. A resinous product according to claim 1, in which (A) is a resin obtained by reacting en epoxide resin with a polyhydric phenol having a free position ortho and/or para to a phenolic hydroxyl group to produce a phenol-terminated resin and polymerizing a vinyl monomer in the phenol-terminated resin.

6. A resinous product according to claim 5, in which the epoxide resin has two terminal glycidyl groups directly attached to an atom or atoms of oxygen, nitrogen or sulfur, and the polyhydric phenol is a bisphenol of formula

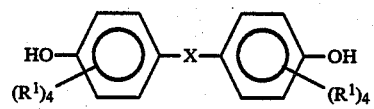

I where
each $R^1$, which may be the same or different, represents a hydrogen atom, a halogen atom, an alkyl group of 1 to 4 carbon atoms, or an alkenyl group of 2 to 4 carbon atoms, with the proviso that at least one of the groups $R^1$ ortho to a phenolic hydroxyl group is a hydrogen atom, and X represents an alkylene or alkylidene group of 1 to 3 carbon atoms, a carbonyl or sulfonyl group, an oxygen or sulfur atom, or a valency bond.

7. A resinous product according to claim 1, in which (A) is a resin obtained by polymerizing a vinyl monomer in an epoxide resin having a secondary alcoholic hydroxyl group and reacting the resulting product with a polyhydric phenol having a free position ortho and/or para to a phenolic hydroxyl group to give a phenol-terminated resin.

8. A resinous product according to claim 7, in which the polyhydric phenol is a bisphenol of formula

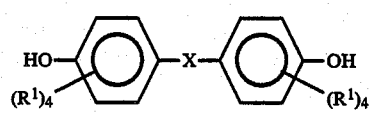

I where
each $R^1$, which may be the same or different, represents a hydrogen atom, a halogen atom, an alkyl group of 1 to 4 carbon atoms, or an alkenyl group of 2 to 4 carbon atoms, with the proviso that at least one of the groups $R^1$ ortho to a phenolic hydroxyl group is a hydrogen atom, and X represents an alkylene or alkylidene group of 1 to 3 carbon atoms, a carbonyl or sulfonyl group, an oxygen or sulfur atom, or a valency bond.

9. A resinous product according to claim 5, in which the vinyl monomer, together with a free radical polymerization initiator, is mixed with the phenol-terminated resin or a solution thereof in an organic solvent, and the mixture is heated at a temperature of 60° to 200° C., the vinyl monomer being used in an amount to provide up to 50% by weight of the resin (A).

10. A resinous product according to claim 7, in which the vinyl monomer, together with a free radical polymerization initiator, is mixed with the epoxide resin having a secondary alcoholic hydroxyl group, or a solution thereof in an organic solvent, and the mixture is heated at a temperature of 60° to 200° C., the vinyl monomer being used in an amount to provide up to 50% by weight of the resin (A).

11. A resinous product according to claim 1, in which the vinyl monomer is a styrene; acrylic or methacrylic acid or an ester thereof; acrylamide, methacrylamide or a hydroxyalkyl derivative thereof; a vinyl ester of a carboxylic acid, or a mixture of two or more of these.

12. A resinous product according to claim 9, in which the polymerization initiator is a peroxide or an azo compound, present in an amount of 1 to 20% by weight of the vinyl monomer.

13. A resinous product according to claim 10, in which the polymerization initiator is a peroxide or an azo compound, present in an amount of 1 to 20% by weight of the vinyl monomer.

14. A resinous product according to claim 1, in which the aldehyde (B) is an aliphatic aldehyde having 1 to 6 carbon atoms.

15. A resinous product according to claim 1, in which (C) is a mercaptocarboxylic acid of formula $$HS-R^7-COOH \qquad IV$$

where $R^7$ denotes an aliphatic, aromatic or araliphatic divalent group of 1 to 10 carbon atoms or such a group containing a carboxylic acid group.

16. A resinous product according to claim 1, in which (C) is an aminocarboxylic acid of formula $$HN-R^8-COOH \qquad V$$
$$\phantom{HN-}|\phantom{-COOH}$$
$$\phantom{HN-}R^9$$

where
$R^8$ denotes an aliphatic, aromatic or araliphatic divalent group of 1 to 10 carbon atoms or such a group containing a carboxylic acid group,
$R^9$ denotes a hydrogen atom, a group of formula $$-CH-N-R^8-COOH, \qquad VI$$
$$\phantom{-}|\phantom{-N-}|$$
$$\phantom{-}R^{10}\phantom{-}R^{11}$$

an alkyl group of 1 to 6 carbon atoms or an alkyl group of 1 to 6 carbon atoms substituted by a carboxylic group or by a group of formula $-CH(R^1-O)OH$ or $-CH(R^{10})OR^{12}$,
with the proviso that $R^8$ and $R^9$ together contain not more than one carboxylic acid group,
$R^{10}$ denotes a hydrogen atom, an alkyl group of 1 to 4 carbon atoms, or an aryl group of 6 to 10 carbon atoms,
$R^{11}$ denotes a hydrogen atom, a carboxylic acid group, an alkyl group of 1 to 6 carbon atoms, or an alkyl group of 1 to 6 carbon atoms substituted by a carboxylic acid group or by a group of formula $-CH(R^{10})OH$ or $CH(R^{10})OR^{12}$, and
$R^{12}$ denotes an alkyl group of 1 to 6 carbon atoms or an alkoxyalkyl group in which the alkoxy group and alkyl group each have from 1 to 6 carbon atoms.

17. A resinous product, according to claim 1, in which (C) is glycine, glutamic acid, aspartic acid, p-aminobenzoic acid, sarcosine or thioglycolic acid.

18. A resinous product, according to claim 1, in which (A), (B) and (C) are heated together in an inert solvent, in the presence of sufficient base to neutralise or partially neutralise any free acid, at a temperature of 60° to 180° C.

19. A resinous product according to claim 1, in which there are used 0.3 to 2.0 moles of (C) per mole of phenolic hydroxyl groups in (A) and 1.1 to 4.0 moles of (B) per mole of (C).

20. A heat-curable composition comprising 100 parts by weight of a product according to claim 1, calculated on its solids content and 2 to 200 parts by weight, calculated on its solids content, of an aminoplast, a phenol-formaldehyde resin, or a blocked polyisocyanate, the aminoplast or phenol-formaldehyde resin having at least 2 groups of formula $$-CH_2OR^{13} \qquad VII$$

attached directly to an amidic nitrogen atom or atoms or directly attached to carbon atoms of a phenolic ring, where $R^{13}$ represents a hydrogen atom or an alkyl group of from 1 to 6 carbon atoms.

* * * * *